(12) United States Patent
Hesher et al.

(10) Patent No.: US 10,072,539 B2
(45) Date of Patent: Sep. 11, 2018

(54) VALVE STEM SEAL ASSEMBLY WITH A SYMMETRICAL RETAINER

(71) Applicant: Dana Automotive Systems Group, LLC., Maumee, OH (US)

(72) Inventors: Eric Hesher, Avilla, IN (US); Troy D. McArthy, Huntertown, IN (US)

(73) Assignee: Dana Automotive Systems Group, LLC, Maumee, OH (US)

( * ) Notice: Subject to any disclaimer, the term of this patent is extended or adjusted under 35 U.S.C. 154(b) by 0 days.

(21) Appl. No.: 15/411,168

(22) Filed: Jan. 20, 2017

(65) Prior Publication Data

US 2018/0209312 A1   Jul. 26, 2018

(51) Int. Cl.
| F16K 41/08 | (2006.01) |
| F01L 3/08 | (2006.01) |
| F02F 1/24 | (2006.01) |

(52) U.S. Cl.
CPC ........ F01L 3/08 (2013.01); F02F 1/24 (2013.01); F16K 41/08 (2013.01); *F02F 2001/244* (2013.01)

(58) Field of Classification Search
CPC ....... F16K 41/08; F02F 1/24; F02F 2001/244; F01L 3/08
USPC .......... 251/214, 337, 330; 123/188.5, 188.6; 277/502
See application file for complete search history.

(56) References Cited

U.S. PATENT DOCUMENTS

| 940,143 | A | 11/1909 | Foltz |
| 2,157,866 | A | 5/1939 | Robertson et al. |
| 2,157,867 | A | 5/1939 | Robertson et al. |
| 2,237,758 | A | 4/1941 | Kurtzweil |
| 2,822,796 | A | 2/1958 | Niess |
| 3,498,621 | A | 3/1970 | Wilson |
| 4,773,363 | A | 9/1988 | Stritzke |
| 4,909,202 | A | 3/1990 | Binford et al. |
| 6,227,548 | B1 | 5/2001 | Netzer |
| 6,450,143 | B1 * | 9/2002 | Hegemier ................. F01L 1/26 123/188.6 |
| 6,609,700 | B2 | 8/2003 | Leimer |
| 6,764,079 | B1 | 7/2004 | Hegemier et al. |

(Continued)

FOREIGN PATENT DOCUMENTS

| EP | 2884061 A1 | 6/2015 |
| JP | H09126323 A | 5/1997 |
| JP | 2017025931 A | 2/2017 |

OTHER PUBLICATIONS

Machine-generated English Translation of JPH09126323, obtained via Espacenet Patent Search.

(Continued)

*Primary Examiner* — Kevin Murphy
*Assistant Examiner* — Kelsey Cary
(74) *Attorney, Agent, or Firm* — Marshall & Melhorn, LLC

(57) ABSTRACT

Provided herein, is a valve stem seal assembly having an elastomeric sealing element, a symmetrical retainer and a valve guide. The retainer has first portion, a second portion, a continuous stop formed between the first portion and the second portion, an inner surface and an outer surface. The valve guide has a top surface in contact with the elastomeric sealing element and a side surface in contact with the inner surface of the second portion of the retainer. The stop of the retainer projects radially inward and the retainer is symmetrical.

12 Claims, 5 Drawing Sheets

(56) References Cited

U.S. PATENT DOCUMENTS

2005/0040603 A1\* 2/2005 Leimer .................... F01L 3/08
                                                          277/502
2013/0200574 A1   8/2013 Hegemier et al.
2015/0167850 A1\* 6/2015 Zoppi ...................... F16K 1/46
                                                          251/214

OTHER PUBLICATIONS

Machine-generated English Translation of JP2017025934, obtained via Espacenet Patent Search.
International Search Report and Written Opinion for Application No. PCT/US2017/021629, dated Jun. 28, 2017).

\* cited by examiner

VALVE STEM SEAL ASSEMBLY WITH A SYMMETRICAL RETAINER

FIELD

The present disclosure relates to a valve stem seal assembly. More particularly, a valve stem seal assembly utilizing a symmetrical retainer.

BACKGROUND

Intake and exhaust valves are widely employed in cylinder heads of internal combustion engines. Such valves, supported for reciprocal motion within valve guides, typically include integral elongated valve stems extending away from the engine cylinder heads, the ends of the valve stems interacting with rotating overhead cams for cyclic or repeated opening and closure of the valves against the force of valve return springs during the combustion cycle. In order to permit unobstructed reciprocal movement of the valve stem in the valve guide, some mechanical clearance must exist between the valve guide and the moving stem. Valve stems reciprocate in and out of the cylinder head each within its individual valve guide. The valve stem seal assemblies are used to control of oil through a mechanical clearance path between each annular engine valve guide and its associated valve stem.

In the typical engine, a valve stem seal assembly is fitted over or atop each valve guide, wherein each valve stem seal assembly includes a retainer frictionally mounted to an associated valve guide. Each valve stem seal assembly normally includes an elastomeric seal for controlling oil between the valve stem and valve guide and a retainer mounted atop of the valve guide to hold the oil seal in place. Such a valve stem seal assembly takes advantage of an elastomeric seal between the retainer and the valve guide or a grip between the retainer and the valve guide.

Although valve stem seal elastomer body design, performance, and construction issues have seen much progress in recent years, there are current incentives to reduce manufacturing costs, particularly costs associated with retainers.

During the manufacturing process of the valve stem seal assemblies the retainers must be oriented, either manually or by a machine, before being inserted into molds that attach the sealing material thereto. This step can slow down the manufacturing. Therefore, there is a need for a cost-effective retainer design to accommodate a wide variety of valve guide geometries that is easy to manufacture and assemble.

SUMMARY

Provided herein, is a valve stem seal assembly having an elastomeric sealing element, a symmetrical retainer and a valve guide. The retainer has first portion, a second portion, a continuous stop formed between the first portion and the second portion, an inner surface and an outer surface. The valve guide has a top surface in contact with the elastomeric sealing element and a side surface in contact with the inner surface of the second portion of the retainer. The stop of the retainer projects radially inward and is positioned along the retainer such that the first and second portions of the retainer are symmetrical.

DESCRIPTION OF PREFERRED EMBODIMENTS

Figure 1A:
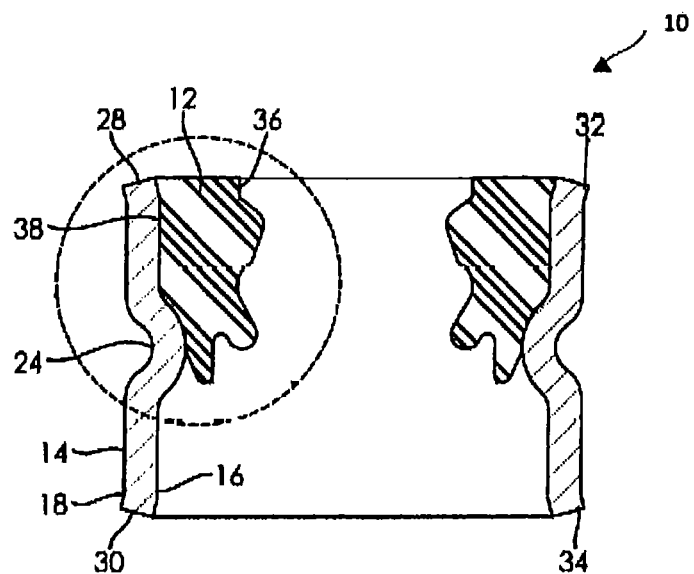
FIG. 1A is a cross-sectional side view a preferred embodiment of a valve stem seal assembly.

It is to be understood that the preferred embodiments may assume various alternative orientations and step sequences, except where expressly specified to the contrary. It is also to be understood that the specific assemblies, articles and features illustrated in the attached drawings, and described in the following specification are simply exemplary embodiments of the inventive concepts defined the appended claims. Hence, specific dimensions, directions, or other physical characteristics relating to the embodiments disclosed are not to be considered as limiting, unless expressly stated otherwise. Also, although they may not be, like elements in various embodiments may be commonly referred to with like reference numerals within this section of the application.

Referring initially to FIG. 1A, a valve stem seal assembly 10 incorporates an elastomeric valve sealing element or valve stem seal 12 affixed or otherwise assembled to a retainer 14. The sealing element 12 may be affixed to an inner surface 16 of the retainer 14, by bonding, or the like. In some embodiments, the retainer 14 is formed of metal; however, other materials may be suitable depending upon the harshness of the particular environment. For example, some glass-filled nylons or other plastics may be suitable for some engine environments, wherein in such cases the retainer can be formed of plastic materials.

Figure 3:
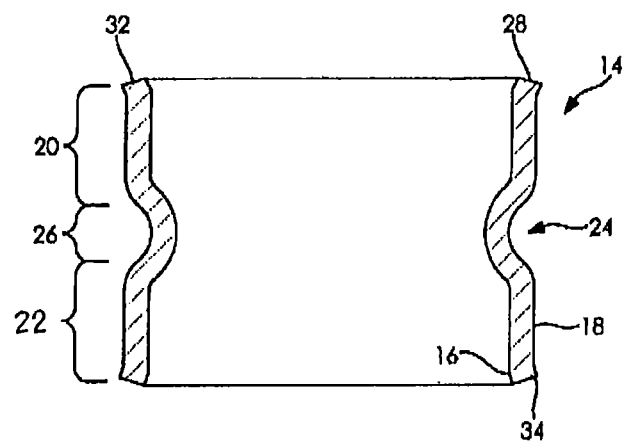
FIG. 3 is a cross-sectional side view of one embodiment of the retainer of the valve stem seal assembly of FIG. 1A.
Figure 4A:
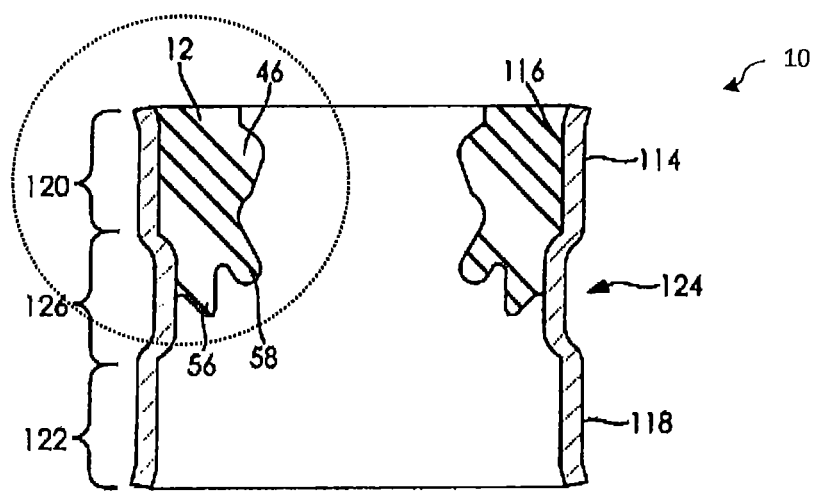
FIG. 4A is a cross-sectional side view of another preferred embodiment of a valve stem seal assembly.
Figure 4B:
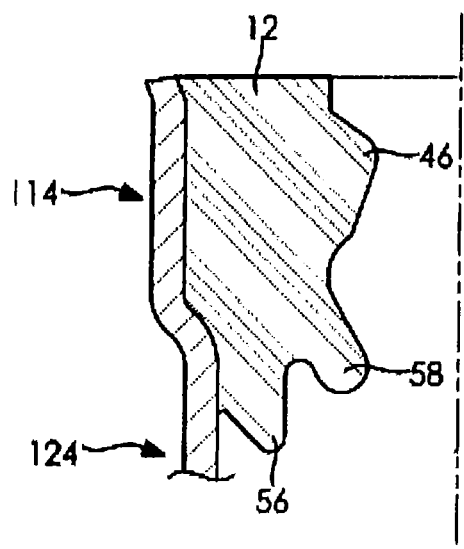
FIG. 4B is a detailed view of the valve stem seal assembly of FIG. 4A.
Figure 5A:
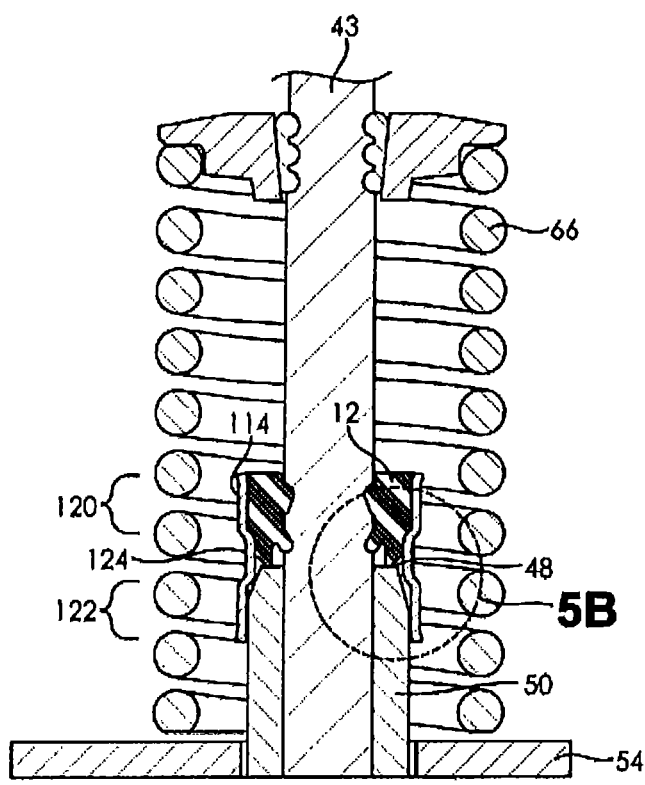
FIG. 5A is a cross-sectional view of the valve stem seal assembly of FIG. 4A installed over a valve guide and valve stem an internal combustion engine.
Figure 5B:
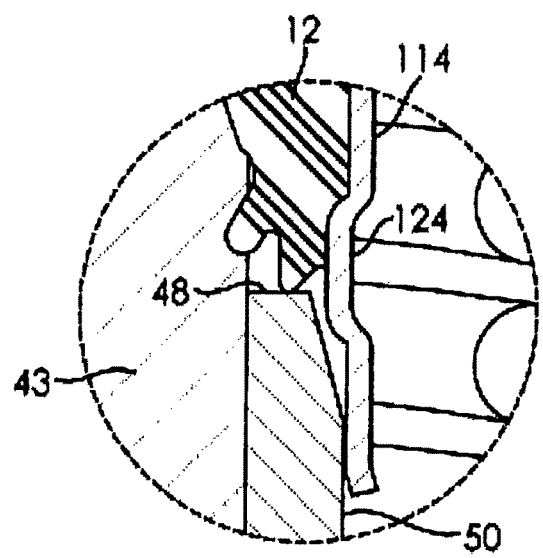
FIG. 5B is a detailed view of the valve stem seal assembly of FIG. 5A.
Figure 6:
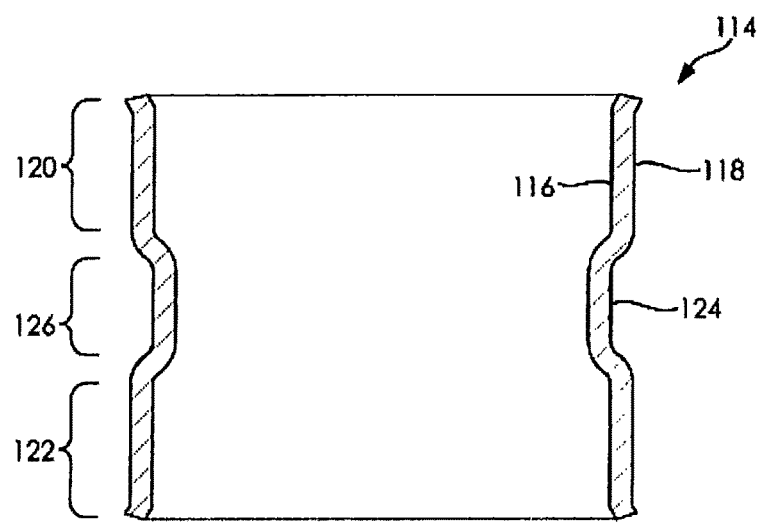
FIG. 6 is a cross-sectional side view of the retainer of the valve stem seal assembly of FIG. 4A.

Referring now to FIGS. 1A and 3, the retainer 14 is substantially cylindrical in shape having an inner surface 16 and an outer surface 18. The retainer 14 has a first portion 20 and a second portion 22 with a stop 24 in between the first portion 20 and the second portion 22. The first portion 20, second portion 22 and stop 24 are integral forming one continuous retainer 14

The stop 24 is positioned in the retainer 14 such that the first portion 20 and the second portion 22 are equal in shape and size. Thus, the retainer 14 is symmetrical above and below the stop 24. Thus, retainer 14 can be oriented with the first portion 20 or second portion 22 downwards toward the valve guide (not shown) during molding assembly. For ease of discussion the valve stem assembly 10 below will be described as having the first portion 20 longitudinally above the second portion 22 with the second portion 22 in contact with the valve guide (not shown); however, it is understood that the position of the first portion 20 and second portion 22 are interchangeable due to the symmetry of the retainer 14.

The stop 24 projects radially inward and provides a reduced diameter portion 26 of the retainer 14. The first and second portions 20, 22 have a diameter greater than the diameter of the stop 24. In some embodiments, the first and second portions 20, 22 are straight walled portions.

Figure 1B:
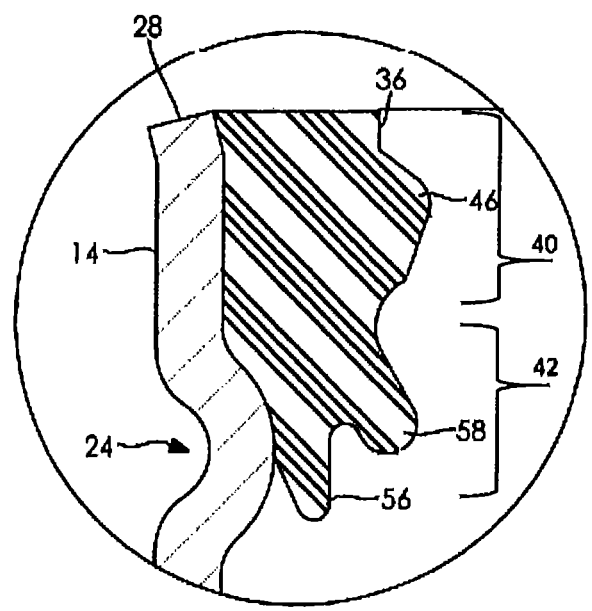
FIG. 1B is a detailed view of the valve stem seal assembly of FIG. 1A.

In some embodiments, the stop 24 is an arc-shaped indentation as shown in more detail in FIG. 1B. However, other shapes that would provide a symmetrical reduced diameter portion 26 in the retainer 14 can be used.

In some embodiments, the retainer 14 includes a top slanted surface 28 and a bottom slanted 30 surface at the ends of the retainer 14. The top and bottom slanted surfaces 28, 30 create pinch edges 32, 34 on the retainer 14.

Figure 2A:
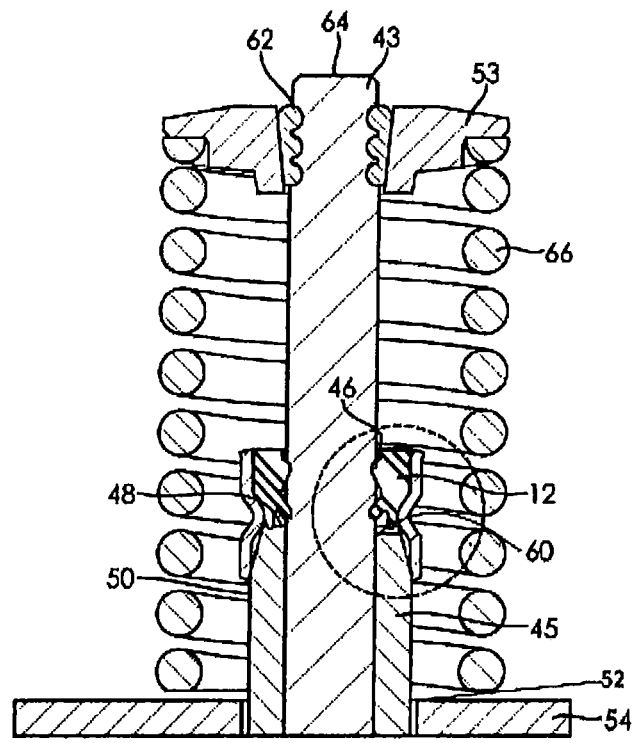
FIG. 2A is a cross-sectional view of the valve stem seal assembly of FIG. 1A installed over a valve guide and valve stem of an internal combustion engine.

In addition, the retainer 14 can be formed of cut steel tubing for simplicity, as opposed to the stamping processes required to form conventional retainers. Such cutting can be achieved, for example, by laser or water jet The sealing element 12 has a generally cylindrical body that includes interior and exterior surfaces 36 and 38, respectively. The sealing element 12 can include an elastomeric upper body portion 40 and a contiguous elastomeric lower body portion 42 together defining the sealing element 12 as shown in FIG. 1B. The upper body portion 40 is positioned above the stop 24 of the retainer 14 between the retainer 14 and a valve stem 43 as shown in FIG. 2A. The interior surface 36 of the upper body portion 40 of the sealing element 12 contains an oil sealing lip 46 adapted for contact with the outer surface of the valve stem 43. Whether or not present, however, those skilled in the art will also appreciate that the lip 46 is sized to assure proper lubrication and consequent avoidance of premature damage to the lip 46 due to friction, as well as any frictional scouring of the valve stem 43.

In some embodiments, a valve guide 45 has a chamfered shape with a top surface 48 have a diameter smaller than the diameter of a side surface 50.

As shown in FIG. 2A, a valve stem seal assembly 10 is adapted to secure the valve guide 44 in position over and through an aperture 52 of a cylinder head deck 54 of an internal combustion engine (not shown). The valve guide 44 is adapted to support reciprocal longitudinal movement of an elongate valve stem (not shown) within the valve guide 44.

Figure 2B:
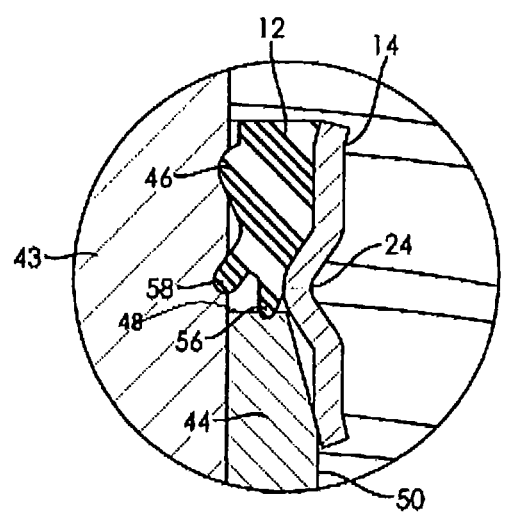
FIG. 2B is a detailed view of the valve stem seal assembly of FIG. 2A.

One aspect of the invention is that the lower body portion 42 of the sealing element 12 includes a second sealing lip 56 and third sealing lip 58 as shown in FIGS. 1B and 2B. The lower body portion 42 is positioned between the stop 24 of the retainer 14 and the valve stem 43 and valve guide 44. The second sealing lip 56 is adapted for contact with the top surface 48 of the valve guide 44 that prevents oil flow migration past the top surface 48 of the valve guide 44. The third sealing lip 58 (or gas sealing lip) is longitudinally spaced above the lip 56 and adapted for contact with the valve stem 43 and positioned proximally to the interface between the valve stem 43 and the valve guide 44. Those skilled in the art will appreciate that the third sealing lip 58 is not required in all applications The lower body portion 42 of the sealing element 12 prevents manifold pressure from passing to the upper body portion 40. The sealing lips 56, 58 are sized to be relative to the outside diameter of the top surface 48 of the valve guide 44. Although only two such lips 56, 58 are displayed in the described embodiment, the number of sealing lips can be varied.

As will be apparent from close review of the drawing, the chamfered shape of the valve guide 44 creates a larger diameter side surface 50. The stop 24 has an inner diameter that is smaller than the diameter of the top surface 48 of the valve guide 44 and acts as a positive insertion stop for the valve stem seal assembly 10 during installation. It will be appreciated that the a portion top surface 48 of the valve guide 44 is in contact with the second sealing lip 56 and vertically spaced from the third sealing lip 58 to optimize sealing effectiveness.

Referring again to FIG. 2A, the described valve stem seal assembly 10 is shown installed in an engine. As depicted, the seal assembly 10 is installed over, and is thus frictionally secured to, the valve guide 44 by retainer 14 frictionally engaging the valve guide 44. It will be apparent that the valve stem seal assembly 10 is actually installed over that portion of the valve guide 44 that protrudes above the deck 54. The valve stem 43 is designed to reciprocate within an aperture 60 that extends through the interior of the valve guide 44. The valve stem seal assembly 10 is adapted to seal and support the valve stem 43 for reciprocal movement of the valve stem 43 in the valve guide 44 longitudinally, as will be appreciated by those skilled in the art. The valve guide 44 extends from an upper surface 60 of a cylinder head deck 54. For this purpose, the valve guide 44 may be machined from a cylinder head deck casting that includes the valve guide 44. Alternatively, the valve guide 44 may be press fit into the cylinder of the head 54.

The operation of the valve stem seal assembly 10 and associated valve may now be described as follows. During the operation of an engine (not shown), the combustion process occurs in rapid cyclic fashion. A valve 43 is designed to open and close an intake (or exhaust) valve port at a rate of several times per second. A cam on a camshaft (neither shown) urges a cam actuated free end 64 of the valve stem 43 downwardly in a reciprocal or cyclic manner against the constant force of a valve return spring 66 disposed about the retainer 14. In accordance with FIG. 2A, it will be appreciated that the return spring 66 bears against the upper surface of the head deck 54 and a valve spring retainer 53.

To the extent that the combustion process occurs inside of the cylinder head, for example, under the cylinder head deck 54, the valve spring retainer 53 is furthest the combustion process. An oily environment exists above the cylinder head deck 54, or one subject to "splash and spray oil," as described in the art. As a result, a valve stem seal assembly 10 is needed to meter oil through the valve stem 43 to guide interface for lubrication (not shown).

One migration path along which oil may travel into the combustion chamber extends between the valve stem 43 and the elastomeric sealing element 12. As earlier noted, the sealing lip 46 is the primary gate for deterring oil travel along this migration path. In addition, the an additional sealing lip (not shown) may be included to control oil flow migration past the top surface 48 of the valve guide 44, and down along a path between the valve stem 43 and the valve stem seal assembly 10.

As best seen in FIG. 2B, the stop 24 of the retainer 14 bears against the sealing lip 56 and provides support for the sealing lip 56. The sealing lip 56 can be affixed, bonded or the like to the stop 24 of the retainer 14. By utilizing the compressive force, F, exerted by stop 24 against the sealing lip 56, the sealing lip 56 provides an effective seal against the top surface 48 of the valve guide 44. In addition, the frictional force exerted by the installation retainer 14 against the valve guide 44 resists vertical movement of the valve stem seal assembly 10, thereby maintaining the effective seal provided by the sealing lip 56 against the top surface 48 of the valve guide 44.

Preferably, the sealing element 12 is molded to the retainer 14. Unlike conventional valve stem seal assemblies that require specific alignment of the retainers, the symmetrical shape of the retainer 14 and the stop 24 provide that the retainer 14 that can be inserted in either direction during molding assembly with either the first portion 20 or the second portion 22 facing upward and still achieve proper alignment. Therefore, when the sealing element 12 is molded to the retainer 14, the retainer 14 can be placed in the mold with either the first portion 20 or second portion 22 facing downwards and the sealing material added. The sealing material can be sealed off from either end of the retainer 14. The pinch edges 32, 34 aid in sealing off the material inside the retainer 14.

The stop 24 has an inner diameter that is smaller than of the chamfered surface of the valve guide 44 and acts as a positive insertion stop for the valve stem seal assembly 10 during seal installation. It will be appreciated that the a portion top surface 48 of the valve guide 44 is in contact with the second sealing lip 56 and vertically spaced from the third sealing lip 58 to optimize sealing effectiveness.

In the described embodiment, the outside diameter of the retainer 14 is larger than the outside diameter of the side surface 50 of the valve guide 44. Moreover, to the extent that the upper body portion 40 is unitary, requiring neither a garter spring nor spring ring, the valve stem seal assembly 10 is manufactured with fewer parts than conventional valve stem seal assemblies.

The manufacturing one-piece valve stem seal assembly 10 including the symmetrical retainer 14 with an elastomeric sealing element 12 bonded to the retainer 14 involves no special spring seat or alignment of the retainer 14 and is thus less expensive to manufacture.

Finally, although in the described embodiment, the retainer 14 can be formed of plain carbon steel, other metals including other heat treatments may be employed. For example, the use of spring steel might assure desired level of resilience for satisfactory frictional retention of the assembly 10 against the outer surface of the valve guide 44 irrespective of the resiliency of the lips 56, 58, 40 for achieving intended purposes.

FIGS. 4A-6 depict another preferred embodiment of the disclosure. This embodiment is similar to the embodiment depicted in FIGS. 1A-3, and the same numbers stand for the same or similar elements of the embodiments depicted in FIG. 1A-3. Consequently, only differences are discussed herein. In this embodiment, the retainer 114 includes a stop 124 providing a reduced diameter portion 126 having straight walls. The reduced diameter portion 126 of the retainer 114 is in contact with the top surface 48 of the valve guide 44 and provides for symmetrical first portion 120 and second portion 122 of the retainer 114. The reduced diameter portion 126 has in inner diameter greater than the diameter of the top surface 48 of the valve guide 44 but less than the diameter of the side surface 50 of the valve guide 44 and acts as a positive insertion stop for the valve stem seal assembly 10 during installation.

It is to be understood that the above description is intended to be illustrative, and not limiting. Many embodiments will be apparent to those of skill in the art upon reading the above description. The scope of the embodiments should be determined, however, not with reference to the above description, but with reference to the appended claims and the full scope of equivalents to which the claims are entitled by law.

What is claimed is:

1. A valve stem seal assembly, comprising:
an elastomeric sealing element having a planar upper surface;
a retainer having a first portion, a second portion, at least one continuous stop between the first portion and second portion, an inner surface and an outer surface, said first portion terminating in a top slanted surface and said second portion terminating in a bottom slanted surface, said top slanted surface and said bottom slanted surface slanted from the inner surface of the retainer to the outer surface of the retainer, wherein said top slanted surface at said inner surface of the retainer is coplanar with said planar upper surface of said elastomeric sealing element; and
a valve guide having a top surface in contact with the elastomeric sealing element and a side surface in contact with the inner surface of the second portion of the retainer, said valve guide having a chamfered portion, wherein the stop projects radially inward and is positioned along the retainer such that the first and second portions of the retainer are symmetrical, wherein said stop has an inner diameter smaller than an inner diameter of said valve guide chamfered portion.

2. The valve stem assembly of claim 1, wherein the stop forms a reduced diameter portion of the retainer.

3. The valve stem seal assembly according to claim 2, wherein the stop is an arc-shaped indentation.

4. The valve stem seal assembly according to claim 2, wherein the reduced diameter portion of the retainer has straight walls.

5. The valve stem seal assembly according to claim 1, wherein the retainer is formed of metal.

6. The valve stem seal assembly according to claim 1, wherein the elastomeric sealing element is positioned above the second portion retainer between the retainer and the valve stem.

7. The valve stem assembly according to claim 6, wherein the stop of the retainer has an inner diameter smaller than the diameter of the side surface of the valve guide and larger than the diameter of the top surface of the valve guide.

8. The valve stem seal assembly according to claim 1, wherein the elastomeric sealing element is disposed within the retainer above the second portion of the retainer and includes a first sealing lip for sealing with a valve stem and a second sealing lip for sealing with the top surface of the valve guide.

9. The valve stem assembly according to claim 8, wherein the elastomeric sealing element includes a third sealing lip between the first sealing lip and the second sealing lip for sealing with the valve stem.

10. The valve stem seal assembly according to claim 1, wherein the top surface of the valve guide has a diameter smaller than the diameter of the side surface of the valve guide.

11. The valve stem seal assembly according to claim 1, wherein the elastomeric sealing element is bonded to the inner surface of the first portion and the stop of the retainer.

12. The valve stem assembly according to claim 7, wherein the top slanted surface and bottom slanted surface terminate in pinch edges at to the retainer outer surface.

* * * * *